G. F. Clemons.
Guide & Hemmer.
No. 2323 Reissued Jul. 31, 1866.
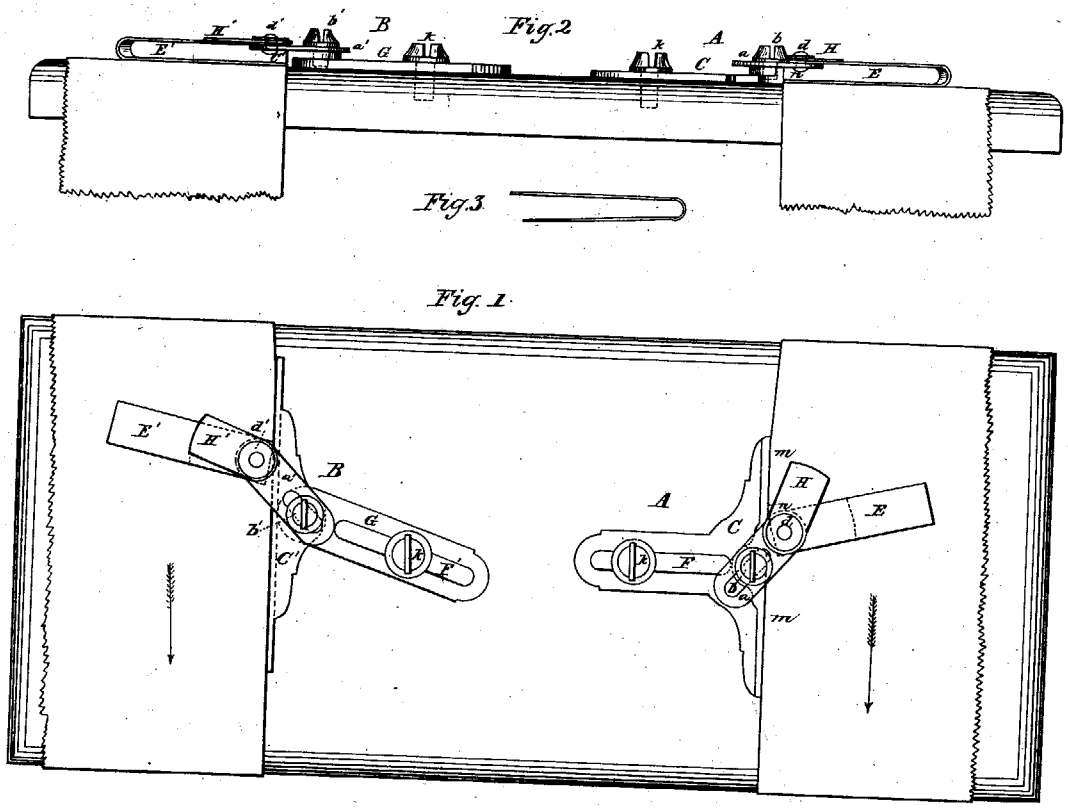
Witnesses
Melville Clemons
Laura D. Clemons
Inventor
George F. Clemons

UNITED STATES PATENT OFFICE.

GEORGE F. CLEMONS, OF SPRINGFIELD, MASSACHUSETTS.

MPROVEMENT IN CLOTH-GUIDES FOR SEWING-MACHINES.

Specification forming part of Letters Patent No. 48,369, dated June 27, 1865; Reissue No. 2,323, dated July 31, 1866.

*To all whom it may concern:*

Be it known that I, GEORGE F. CLEMONS, of Springfield, in the county of Hampden and State of Massachusetts, have invented a new and useful Improvement in Cloth-Guides for Sewing-Machines; and I do hereby declare and make known that the following is a full, clear, and exact description of the same, reference being had to the accompanying drawings, and the letters and figures marked thereon, which form part of this specification.

My said invention consists in the adaptation to a sewing-machine of a spring pressure-plate having a smooth bearing-surface for a cloth-guide, resting upon the material across the line of the seam being sewed, and in the application of adjustably-variable pressure to said plate, so that its pressure shall be greater upon the material outside than upon the inside of the line of the seam, and thus producing a guiding action which directs the material inward toward the gage-face, as desired.

To enable those skilled in the art to understand how to construct and use my invention, I will proceed to describe the same with particularity, making reference in so doing to the aforesaid drawings, in which—

Figure 1 represents a plan or top view of my invention; Fig. 2, a side view, showing two forms of my cloth-guide attached to gages upon the bed of a sewing-machine; and Fig. 3 is a side view of the spring pressure-plate or guide.

Similar letters of reference in the several figures denote the same parts of my invention.

The cloth-guide (designated by the letter A) is attached to a cloth-gage, C, and consists of a spring-plate, E, pressure-plate H, rivet *d*, and link *a*, which last carries at its opposite end and upon its upper side the aforesaid spring-plate E and pressure-plate H, the latter being placed above the spring-plate, and both being secured to the link *a* by the rivet or pin *d*, upon which they turn.

The spring-plate E extends out from the face *m* of the gage-plate C, and is bent down and under near its middle point, forming two nearly parallel leaves, the lower one of which rests upon the cloth, and is curved slightly downward at its inner end, as shown in Fig. 3, so as to touch evenly in all its parts upon the cloth when pressed down upon it.

By the pivoting of the spring-plate E and the pressure-plate H to the link *a* and the slot in the opposite end of said link the guide and gage combined are adapted to various kinds of sewing-machines, by their permitting the necessary adjustments of the spring-plate E to bear upon the advancing cloth in front of the needle, extending from the gage-face at right angles or obliquely, as may be desired, so that the inner end of the lower leaf of the spring-plate E shall touch or nearly touch the gage-face *m*, and so that the pressure-plate H may be turned on or off the spring-plate E. The pivoted and sliding link *a* permits the described adjustments of the spring-plate E, and adapts the combined guide and gage to different kinds of machines which differ in respect to the positions of the screw-holes in the bed-plate provided for fastening the gage thereunto, and also in respect to the direction of the feed-movement.

The cloth-guide (designated by the letter B) is similar to that just described and is similarly used, with the exception of pivoting the part G of the gage to the portion C′, which is done to permit a greater range of adjustment to suit the requirements of different sewing-machines, varying in the manner aforesaid.

When the cloth guide and gage are made to be used upon any particular class of sewing-machines having their screw-holes for attaching the gage-plate in any established position relative to the needle, the link *a* may be dispensed with, and the spring-plate E and pressure-plate H may be pivoted directly to the gage, and may be adjusted either at right angles or obliquely with respect to its face *m*, as desired.

In operating the cloth-guide it is attached to the machine by adjusting the gage-face *m* at the distance from the needle which the seam is required to be from the edge of the cloth, and by fastening the gage to the bed-plate by the set-screw, when the spring-plate E is adjusted in its before-mentioned position, so as to guide the cloth and cause the edge thereof to move along in contact with the gage-face *m* by the action of the spring-plate.

By adjusting the spring-plate E obliquely with respect to the gage-face *m* and inclining backward from the needle so as to bear upon the cloth and across the line of the seam diagonally, the outer part of the lower leaf of the spring-plate acts first upon the advancing cloth, and the inclined edge and body of the said lower leaf, pressing upon the cloth, deflects its forward movement and causes the edge of the cloth to bear against the gage-face *m*, which checks its lateral movement, and the cloth is guided and directed through the machine in a line parallel with the gage-face *m*.

By adjusting the spring pressure-plate E at right angles with the line of the gage-face *m*, and extending out from the gage-face in front of the needle, pressing upon the cloth at right angles across the line of the seam, the same guiding result is attained, and the cloth guided toward or from the gage-face by simply increasing or decreasing the pressure of the lower leaf of the spring-plate at its outer or bow end upon the cloth, which is done by turning the pressure-plate H so as to bear more or less forcibly upon the spring-plate E; and when it is desired to guide the cloth inward toward the gage-plate, so as to run parallel therewith, the pressure-plate H is turned more upon the spring-plate E, far enough to cause it to give greater pressure on the cloth outside the line of the seam than between the seam and the gage-face.

Should the cloth be guided too forcibly against the gage-face, by turning the pressure-plate H somewhat off from the spring-plate, decreasing the pressure thereof upon the outside of the seam, the cloth will be guided inwardly with less force.

Should it be required to guide the cloth away from the gage-face *m*, this result may be accomplished by turning the pressure-plate entirely off from the spring-plate, from the fact that the construction of said spring-plate is such that when the pressure-plate is turned off from it the inner end of the lower leaf of the spring-plate bears slightly more upon the cloth than the outer or bow end does.

It is obvious that more pressure is required upon the cloth to properly guide the same when the seam being sewed is at a considerable distance from the gage-face than when the seam being sewed is nearer to the gage-face.

The principle of the action of the described devices by which the aforesaid guiding results are produced when the spring-plate is set at right angles with the gage-face is, that the pressure of the spring-plate upon the cloth acts to detain or hold it back in its forward movement toward the needle, and when the pressure is greater upon the outside of the seam the cloth will be detained more upon that side, while that portion of the cloth inside the seam will move forward more freely than the part outside the seam; and hence the result of the pressure is to swing or deflect the cloth in its forward movement toward the gage-face *m*.

The principle of the guiding action is the same in guiding the cloth away from the gage-face by increased or greater pressure upon the inside of the seam.

The importance of regulating the pressure of cloth-guide plates upon the cloth, as described, is obvious. For guide-plates so constructed that there could be no adjustment of their pressure would require a great pressure at their outer end to adapt them for sewing seams at a great distance from the edge of the cloth; but this great and constant pressure would be very objectionable, tending to force the cloth too forcibly against the gage-face when the seam is sewed near the edge of the cloth, and especially would this be so in sewing light delicate fabrics, which require a nice adjustment and distribution of the pressure upon them, and only so much pressure as will gently guide it against the gage-face, so that its fine yielding edge may not be injured or folded up against the face of the gage; and it is only by using very delicately-adjustable pressure, as herein described, for guiding the material, that these conditions are provided for.

Having described the nature, construction, and operation of my invention, I will now specify what I claim and desire to secure by Letters Patent:

1. In a sewing-machine, a cloth-guide adapted to give adjustably-variable pressure upon the material being sewed, for the purposes specified.

2. In combination with a cloth-gage upon a sewing-machine, a spring pressure-plate presenting a smooth bearing-surface upon the material being sewed and having means for an adjustment of the pressure for guiding the same toward the gage-face and for distribution of its pressure upon the material, substantially as and for the purposes set forth.

3. Regulating the pressure of the guide-plate by means of the auxiliary plate H, arranged and operating substantially as and for the purposes specified.

4. The combination of the spring-plate E and pressure-plate H with the cloth-gage C, in the manner and for the purposes shown and described.

5. The combination of the spring-plate E and pressure-plate H with the gage-plate C′, pivoted to the shank G, substantially as and for the purpose set forth and shown.

6. The combination of the pivoted gage-plate C′ and gage-shank G, arranged and operating substantially as and for the purposes specified.

GEORGE F. CLEMONS.

Witnesses:
MELVILLE CLEMENS,
LAURA D. CLEMONS.